(12) United States Patent
Aragon et al.

(10) Patent No.: US 9,045,919 B2
(45) Date of Patent: Jun. 2, 2015

(54) PNEUMATIC DOOR OPENING AND SECURITY SYSTEM

(75) Inventors: Daniel M. Aragon, Meridian, ID (US); Peter J. Wachtell, Boise, ID (US); John J. Prehn, Boise, ID (US); Todd J. Lindsey, Boise, ID (US); John C. Cash, Nampa, ID (US)

(73) Assignee: COLD CHAIN, LLC, Boise, ID (US)

( * ) Notice: Subject to any disclaimer, the term of this patent is extended or adjusted under 35 U.S.C. 154(b) by 46 days.

(21) Appl. No.: 13/586,021

(22) Filed: Aug. 15, 2012

(65) Prior Publication Data

US 2013/0042532 A1    Feb. 21, 2013

Related U.S. Application Data

(60) Provisional application No. 61/523,786, filed on Aug. 15, 2011.

(51) Int. Cl.
*B60J 5/00* (2006.01)
*E05B 81/10* (2014.01)

(52) U.S. Cl.
CPC ....................................... *E05B 81/10* (2013.01)

(58) Field of Classification Search
CPC ................. B60J 5/108; B60J 5/10; B60J 5/04
USPC ............................................ 296/146.4, 146.8
See application file for complete search history.

(56) References Cited

U.S. PATENT DOCUMENTS

| | | | |
|---|---|---|---|
| 2,042,002 A | 5/1936 | Hovey | |
| 2,258,971 A | 10/1941 | Carlson | |
| 2,827,118 A | 3/1958 | Wendt | |
| 3,017,218 A | 1/1962 | Groth et al. | |
| 3,084,403 A | 4/1963 | Elmendorf | |
| 3,662,410 A | 5/1972 | Lankheet | |
| 3,724,526 A | 4/1973 | Huprich | |
| 3,856,072 A | 12/1974 | Sund | |
| 4,445,958 A | 5/1984 | Jaksha | |
| 5,016,700 A | 5/1991 | Wegner et al. | |
| 5,239,779 A * | 8/1993 | DeLand et al. | 49/360 |
| 5,515,649 A * | 5/1996 | Strab | 49/280 |
| 5,738,161 A | 4/1998 | Martin | |
| 5,915,445 A | 6/1999 | Rauenbusch | |

(Continued)

OTHER PUBLICATIONS

Non-Final Office Action dated Aug. 16, 2013, for U.S. Appl. No. 13/585,994, filed Aug. 15, 2012, pp. 1-9.

(Continued)

*Primary Examiner* — Joseph D Pape
(74) *Attorney, Agent, or Firm* — MH2 Technology Law Group LLP (57) ABSTRACT

A pneumatic door system and a method of using the same are disclosed herein. According to one embodiment, a trailer may include a seamless main door and at least one side door. The doors may be configured to be locked shut with a system of pneumatic locks. The main door may be configured to open and close as controlled by pneumatic pressure applied to a door cylinder. The pneumatic system may be configured to be controlled by an interior control box. The pneumatic system may be configured to operate off of pneumatic pressure in an auxiliary air tank, the pressure being protected by a series of one-way check valves. The pneumatic system may also be configured to operate wirelessly using RFID or Bluetooth technology, among other things, to secure the cargo and facilitate ingress and egress to the trailer.

16 Claims, 13 Drawing Sheets

(56) References Cited

U.S. PATENT DOCUMENTS

| | | |
|---|---|---|
| 6,443,209 B1 | 9/2002 | Hurst |
| 7,111,661 B2 | 9/2006 | Laugenbach et al. |
| 2003/0173040 A1 | 9/2003 | Court et al. |
| 2008/0110580 A1 | 5/2008 | Hoerner et al. |
| 2010/0132894 A1 | 6/2010 | Knutson et al. |
| 2010/0270826 A1* | 10/2010 | Weeda et al. .............. 296/146.1 |

OTHER PUBLICATIONS

Final Office Action dated Dec. 20, 2013, for U.S. Appl. No. 13/585,994, filed Aug. 15, 2012, pp. 1-9.

Final Office Action dated Oct. 10, 2014, for U.S. Appl. No. 13/585,994, filed Aug. 15, 2012, pp. 1-12.

* cited by examiner

PNEUMATIC DOOR OPENING AND SECURITY SYSTEM

This application claims benefit of U.S. Provisional Application No. 61/523,786, filed Aug. 15, 2011, the disclosure of which is hereby incorporated by reference in its entirety.

BACKGROUND

The present application relates generally to the field of doors and more specifically to pneumatic doors for trailers and containers.

The delivery of perishable items presents many challenges. For instance, sea food is a highly perishable product. A variety of methods for preserving the freshness of sea food exist. In some cases, sea food is kept alive during transport. In other cases, sea food is refrigerated or frozen soon after it is extracted from the ocean and transported quickly to its final destination. Transporting sea food from coastal regions to land-locked regions presents significant health and safety challenges.

Meats are also a very perishable product. Meats may spoil within hours if they are not treated properly. As is the case with sea food, meats are refrigerated or frozen soon after animals are slaughtered and are stored at low temperatures during transport to avoid spoilage.

Many food products are stored below freezing (0° C. or 32° F.). For instance, frozen dinners are common items in supermarkets today. The dinners are prepared and stored at below freezing temperatures in order to avoid spoilage which might otherwise occur after production but before the dinner products are consumed. Fruits and vegetables are also often transported at near- or sub-zero temperatures in order to preserve freshness.

In addition to food products, pharmaceutical and chemical products are also subject to spoilage. For instance, many vaccines are stored and transported in temperature-controlled conditions in order to maintain their effectiveness.

The storage and transportation of these and other products often involves a temperature-controlled supply chain, or cold chain.

Additionally, foodstuffs, pharmaceuticals, and other chemical products—whether or not they need to be refrigerated—are potential targets of terrorists.

SUMMARY

There is a need for a door system for trailers and containers that offers one or more of the following benefits. There is a need for a system that can aid in effectively maintaining the trailer or container contents at or below a specific temperature. Having to repeatedly open and close trailer or container doors can put significant physical stress on drivers, slow down the delivery process, introduce undesirable amounts of external air into the trailer or container, and increase the probability of injury. Furthermore, there is a need for a secure system that effectively protects the contents of trailers and containers from tampering.

In an embodiment, the current disclosure proposes a system of pneumatic doors and locks with secure back-up systems to protect the contents of trailers and containers. In another embodiment, the current disclosure proposes an automatic system of access to the interior of trailers and containers.

Another embodiment of the present disclosure is directed to a pneumatic door system. The door system comprising a main door. A pneumatic lock is positioned so as to be capable of locking the main door. The system also includes a pneumatic mechanism for opening the main door; a tank and a system of valves and conduits configured to provide fluid communication between the tank, the pneumatic lock and the pneumatic door opening mechanism; and an electronic controller configured to open and close the valves to allow pneumatically opening or closing of the main door and pneumatically locking or unlocking of the pneumatic lock.

Yet another embodiment of the present disclosure is directed to a method of operating a pneumatic door system. The method comprises receiving a wireless signal for opening an overhead door positioned on a delivery vehicle. A pneumatic mechanism is actuated to open the overhead door. A time is determined for closing the overhead door. The pneumatic mechanism is actuated to close the overhead door.

Still another embodiment of the present disclosure is directed to a method of operating a pneumatic door system that includes a controller configured for receiving wireless signals. The method comprises activating a wireless transmitter to transmit a signal to the controller for opening an overhead door positioned on a delivery vehicle. The overhead door is closed by one of a) carrying the wireless transmitter out of range of the controller, or b) causing the wireless transmitter to stop transmitting the signal.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
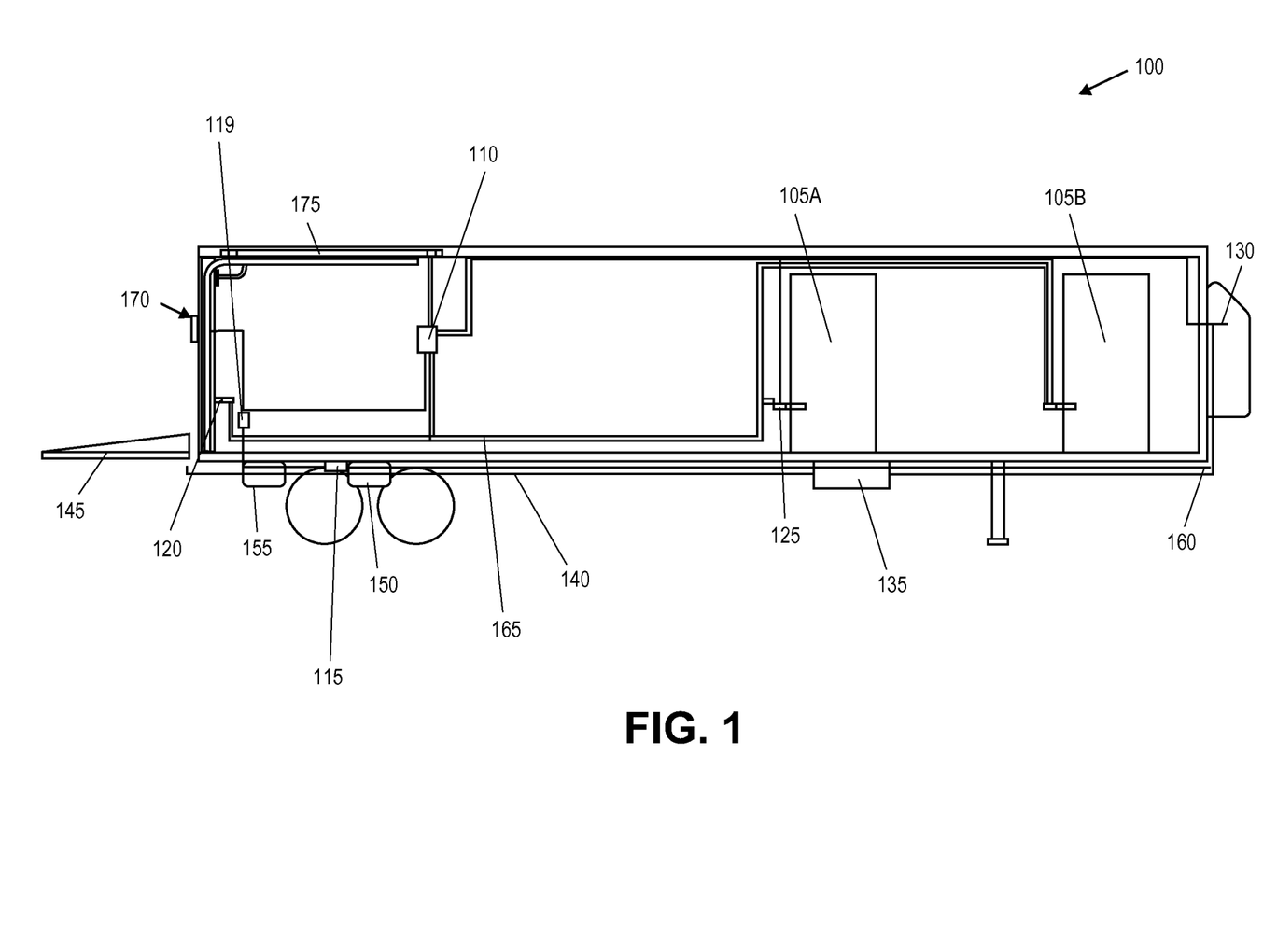
FIG. 1 shows a schematic view of a trailer, according to an embodiment of the present disclosure.

FIG. 1 shows a schematic view of a trailer 100, according to an embodiment of the present disclosure. Trailer 100 includes a main door (see FIG. 3, 301), and two side doors 105A and 105B, although any number or type of doors can be employed. Access to the main door is facilitated by an optional lift gate 145. In an embodiment, a ramp may be used instead of lift gate 145. The lift gate 145 can be powered by batteries, such as, for example, batteries 135, which are connected to the lift gate 145 by power line 140. The main door 301 is configured to open and close using the pneumatic cylinder 175, which is electrically connected to and controlled by the control box 110. Pneumatic pressure originates from an air tank 150, which is connected to an air supply line 160 in one direction, and an inline pressure relief check valve 115 in the other direction. The inline pressure relief check valve 115 maintains air pressure in the air tank 150, which may be, for example, a main brake air supply tank. The inline pressure relief check valve 115 feeds air pressure into the auxiliary air tank 155, which is connected to a one-way check valve 119 and then in turn to the control box 110. The control box 110 manages the delivery of pneumatic pressure to the main door lock 120 and the side door lock system 125 via the door lock supply lines 165, which can be, for example, embedded in the wall structure of the trailer 100. Also attached to the pneumatic system in some embodiments, is an exterior manual air dump valve, or air switch, 170. If the door fails to open, a user can flip the exterior air switch and operate the door manually. Also shown in FIG. 1 is the optional refrigeration unit 130.

In operation, the air tank 150 provides pneumatic pressure to the door and lock systems. In an embodiment, the inline pressure relief check valve 115 may be configured to maintain an adequate air supply for a trailer's pneumatic braking system and prevent any air leaks in the pneumatic distribution system from affecting braking performance of the trailer 100. In some embodiments, the auxiliary air tank 155 is configured to receive pneumatic pressure from the inline pressure relief check valve 115 and then distribute the pneumatic pressure throughout the trailer's air supply network. In some embodiments, the trailer 100 may include the one-way check valve 119 positioned at the interior of the trailer 100, as discussed above, in order to protect against pressure loss in the system caused by, among other things, attempts to tamper with the air lines beneath the trailer, faults in the air supply line 160, the air tank 150, the auxiliary air tank 155, and the lines that interconnect them. According to some embodiments, the control box 110 is configured to receive and distribute pneumatic pressure from the auxiliary tank 155. According to some embodiments, the control box 110 is configured to distribute pneumatic pressure to the pneumatic cylinder 175 to open the main door 301. According to some embodiments, the control box 110 is configured to distribute pneumatic pressure to the main door lock 120 and the side door lock system 125. In one embodiment, the main door and the side doors 105A and 105B cannot open unless the main door lock 120 and the side door lock system 125 are respectively unlocked. According to some embodiments, the main door lock 120 and the side door lock system 125 lock automatically when the main door and the side doors 105A and 105B are closed.

Figure 2:
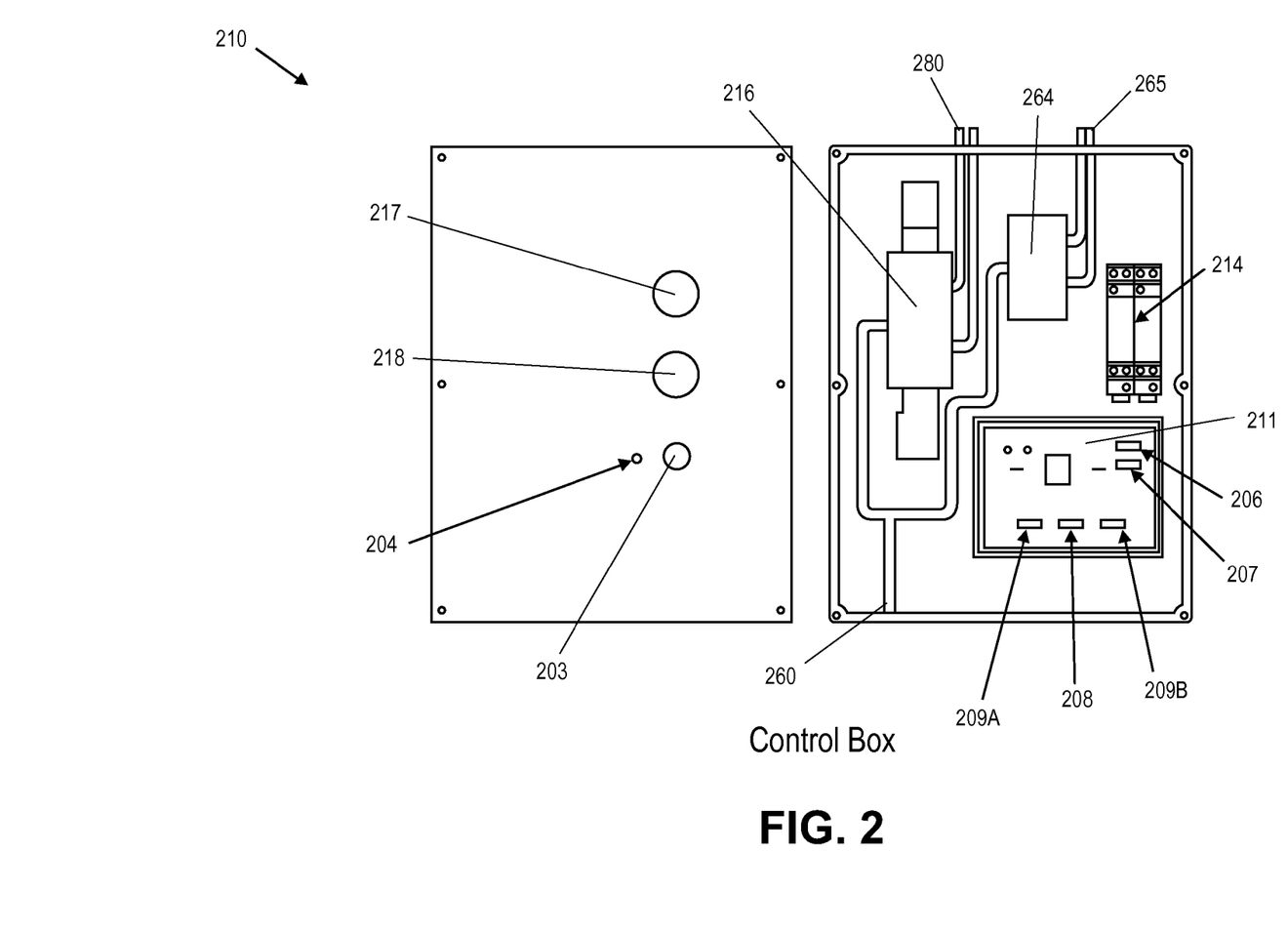
FIG. 2 illustrates a control panel, according to an embodiment of the present disclosure.

FIG. 2 shows one embodiment of the control box 210. According to one embodiment, the control box 210 includes two valves, a main door air valve 216 and a side door lock valve 264. The air supply lines 260 enter the control box 210 and fluidly connect to the main door air valve 216 and the side door lock valve 264. The main door air valve 216 is connected to the door cylinder air lines 280, which are in turn connected to the pneumatic cylinder 175. The side door lock valve 264 is connected to the side door lock air lines 265. According to some embodiments, the control box 210 also includes programmable timers 214 for automatically closing doors after a predetermined time period. According to some embodiments, the control box 210 also includes a microprocessor and timer controller 211 which may include a safety bump edge connector 206, a photo-eye, light curtain beam sensor 207, at least one RFID connector (an RFID connector 209A and an RFID receiver connector 209B are shown), and a Bluetooth connector 208. The control box 210 may include an exterior surface that may be configured to house a movement button 217 (i.e. up and down), an emergency air release 218, at least one LED 204, and a programming button 203.

In operation, the microprocessor and timer controller 211 and the programmable timers 214 may be configured to control the distribution of pneumatic pressure throughout the pneumatic network of the trailer 100. According to one embodiment, the microprocessor and timer controller 211 may be configured to open the main door air valve 216 and/or the side door lock valve 264 upon the reception of an acceptable RFID transmission. According to this embodiment, pneumatic pressure may be sent through the main door air valve 216, through the door cylinder air lines 280, and on to the pneumatic cylinder 175, which causes the main door to either open or close. Also according to this embodiment, pneumatic pressure may be sent through the side door lock valve 264, through the side door lock air lines 265 and on to the side door lock system 125. According to another embodiment, the movement button 217 may be configured to trigger a transmission of pneumatic pressure to the main door. In one embodiment, the emergency air release 218 may be configured to release pneumatic pressure and thereby facilitate the opening of the main and/or side doors 105A and 105B. For example, a user can push the interior emergency air release 218 and manually open the main door.

In another embodiment, programming button 203 may be configured to cause the microprocessor and timer controller 211 and/or the programmable timers 211 to enter a programming state where the operation of the pneumatic system may be altered or adjusted. The LED 204 may be configured to indicate success and/or failure of the programming process triggered by the programming button 203. The LED 204 may be configured to shine red, green, and yellow, among other colors, to indicate different operational conditions of the control box 210. According to some embodiments, the microprocessor and timer controller 211 may be configured to allow RFID, and/or Bluetooth signal reception via connectors 209A and/or 209B and 208, respectively. The microprocessor and timer controller 211 may be configured such that signals received via RFID and/or Bluetooth may facilitate the opening and/or closing of the main door, and/or the activating and/or deactivating of the main door lock 120 and/or side door lock system 125.

The control box 210 may react in a predetermined manner based on the proximity of RFID and/or Bluetooth transmitters. For instance, in one embodiment, the control box 210 may be configured to activate certain pneumatic supply lines when an RFID or Bluetooth transmitter is in range and deactivate the certain pneumatic supply lines when the transmitter is out of range. In one exemplary embodiment, the control box 210 may be configured to open the main door lock 120 and the main door 301 when an RFID or Bluetooth transmitter is in range and activated, and then close the main door 301 and the main door lock 120 when the RFID or Bluetooth transmitter is either no longer in range or no longer transmitting. In some embodiments, the programmable timers 214 may be configured to deactivate the RFID or Bluetooth receivers after a pre-determined time even while the RFID or Bluetooth transmitter is still in range.

The control box 210 may also optionally include means for signaling operation status by sound. For instance, the control box 210 may include a speaker (not shown) configured to emit a chirping sound when there is an RFID transmitter in proximity.

Another possible embodiment can include the presence of internal and/or external switches (not shown) configured to activate and deactivate the RFID system of the trailer 100. Both the internal and external switches can be used to close the door and turn off the RFID system, which enables the driver to work inside of the RFID detection range without activating the door.

Figure 3:
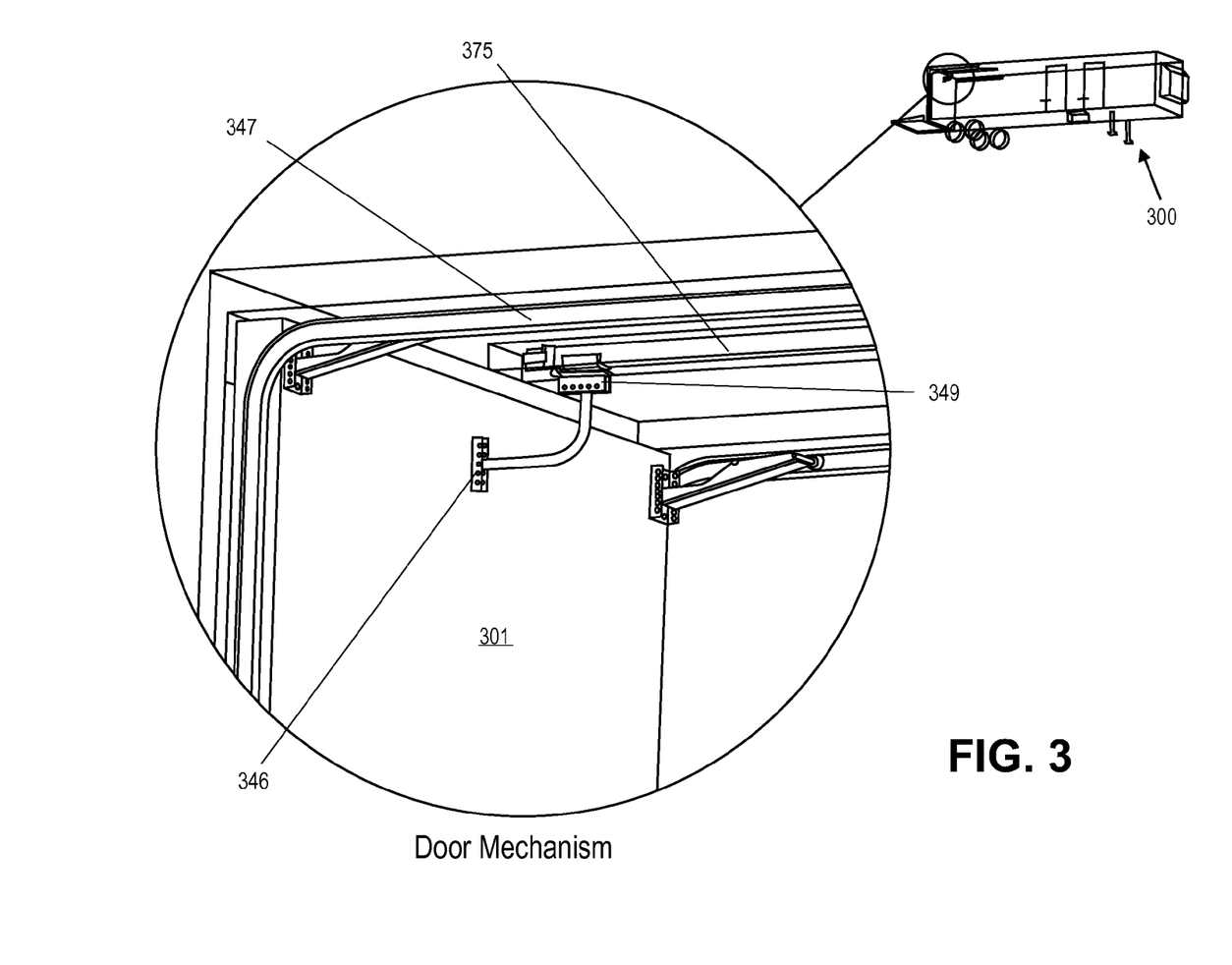
FIG. 3 illustrates a trailer door mechanism, according to an embodiment of the present disclosure.

FIG. 3 illustrates one embodiment of the door mechanism of the trailer 300. In some embodiments, the main door 301 is connected to an adjustable door bracket 346 which is connected in turn to a carriage assembly 349, which is configured to run on the pneumatic door control cylinder 375. In an embodiment, the main door 301 can be configured so as to reduce the amount of cold air that escapes the trailer 300 on the one hand, and the amount of air from the exterior that enters the trailer 300 on the other hand. For instance, door 301 can comprise a paneled door enclosed in a seamless protective sheath. Other examples of main door 301 are discussed below. In some embodiments, the carriage assembly 349 may also include a manual pin release. The main door 301 is also operably connected to the door track 347.

In operation, the main door 301 is configured to open and close. In some embodiments, the pneumatic door control cylinder 375 can receive pneumatic pressure, as determined by the control box 210, from the door cylinder air lines 280 and the main door air valve 216. In response to the received pneumatic pressure, the pneumatic door control cylinder 375 engenders movement of the carriage assembly 349. According to this embodiment, the movement of the carriage assembly 349 causes the main door 301 to move, either up or down, along the door track 347.

Examples of overhead doors that can be used as main door 301 are described in more detail in copending U.S. patent application Ser. No. 13/585,994, entitled INSULATED OVERHEAD DOOR, filed on Aug. 15, 2012, and U.S. Provisional Application No. 61/523,786, filed Aug. 15, 2011, the disclosures of both of which are incorporated herein by reference in their entirety. In an embodiment, the main door can be an insulated roll-up door constructed with a solid ballistic thermoplastic exterior shell, thereby eliminating horizontal seams between section panels. This can improve thermal performance and provide a clean flat surface on which to install advertising decals. The door panel core can be made from a flexible foam, such as closed cell EVA foam, or any other suitable type of foam.

Figure 4:
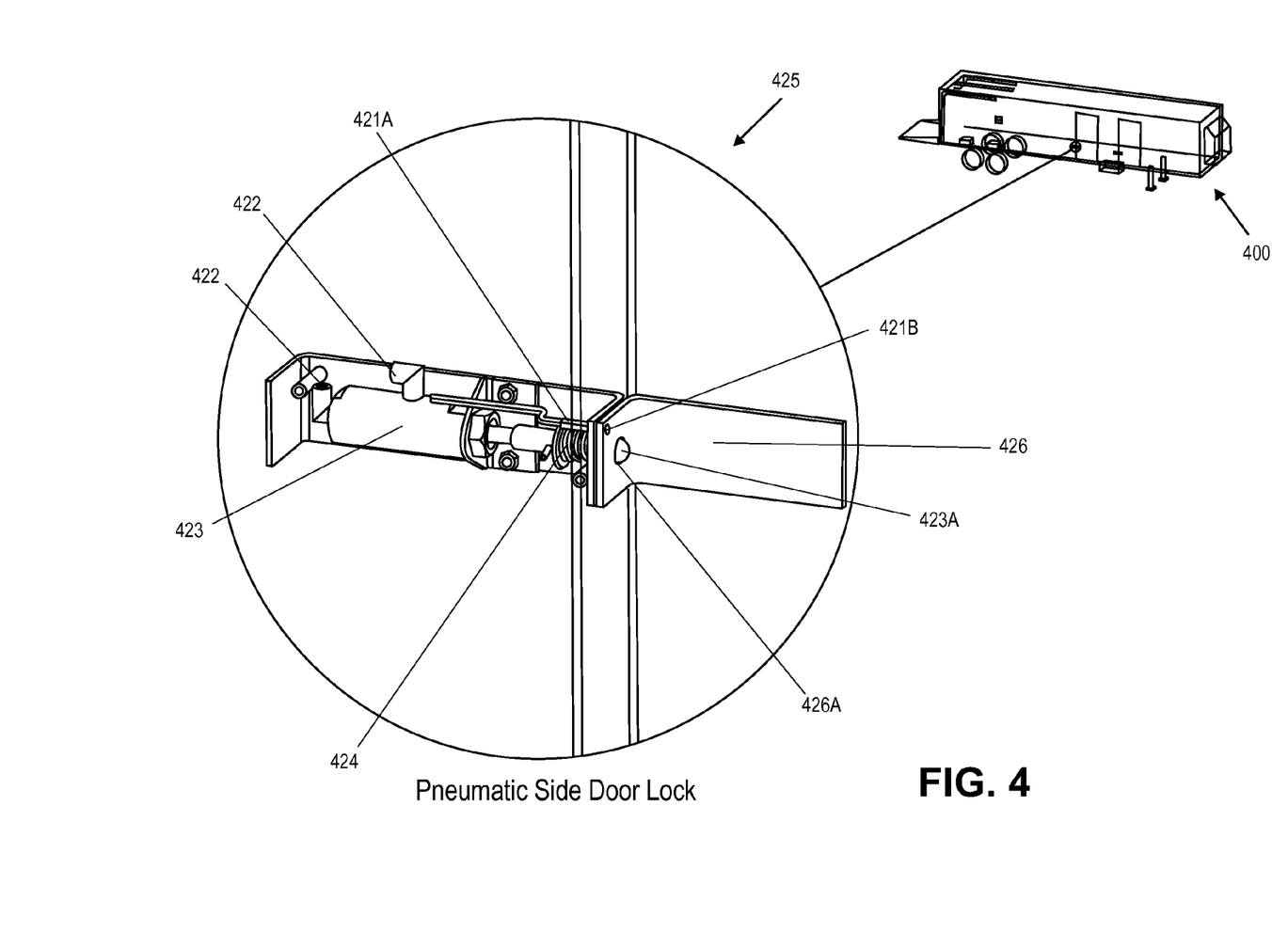
FIG. 4 illustrates a trailer door locking mechanism, according to an embodiment of the present disclosure.

FIG. 4 illustrates one embodiment of a locking mechanism of the trailer 400. In an embodiment, the main door locking mechanism 120 comprises the same structure as the side door locking mechanism 425 of FIG. 4. According to some embodiments, the side door lock mechanism 425 comprises a pneumatic cylinder 423, at least one air intake 422, a spring mechanism 424, a magnetic proximity switch 421A, a magnet 421B, a pneumatic bolt 423A, a receiver plate 426, and a drop bolt receiver 426A. Drop bolt receiver 426A can be, for example, a hole in the receiver plate 426 through which the pneumatic bolt 423A can extend.

In operation, the locking mechanism 425 is connected to the door lock air supply lines 165, and/or the side door lock air lines 265 of the control box 210 via the air intakes 422. According to an embodiment, as pneumatic pressure is transmitted to the pneumatic cylinder 423 of the locking mechanism 425, pneumatic bolt 423A is configured to retract into the pneumatic cylinder 423. According to an embodiment, the pneumatic cylinder 423 applies any suitable amount of pressure for moving and/or maintaining the position of the pneumatic bolt 423A in a desired manner. An example of a suitable pressure range is 50 to 150 lbs of pneumatic pressure, such as about 120 lbs of pneumatic pressure, on the pneumatic bolt 423A. In an embodiment, pneumatic pressure inside the pneumatic cylinder 423 holds the lock bolt in place. In one embodiment, the spring mechanism 424 affects the position of the pneumatic bolt 423A in the event of loss of air pressure. For example, the spring mechanism 424 can retract the pneumatic bolt 423A upon a loss of pneumatic pressure. Alternatively, the spring mechanism 424 can maintain the pneumatic bolt 423A in an extended position into the bolt receiver 426 in the event of loss of air pressure. The magnetic proximity switch 421A coupled with the pneumatic cylinder 423 can be configured to react when lined up with embedded magnet 421B. According to this embodiment, once the door (e.g. 105A) is closed, the magnetic proximity switch 421A lines up with the embedded magnet 421B and causes the pneumatic bolt 423A to extend into the drop bolt receiver 426A.

The embodiments illustrated by FIG. 4 illustrate the spring mechanism 424 in a fail-safe embodiment. The embodiments, as explained above, may alternatively be configured to operate with a spring mechanism 424 in a "fail-secure" embodiment. The difference of the two embodiments being that in one case the doors remain locked (i.e., the pneumatic bolt 423 remains engaged) with a loss of pressure, and in the other case, the pneumatic bolt retracts with a loss in pneumatic pressure.

Figure 5:
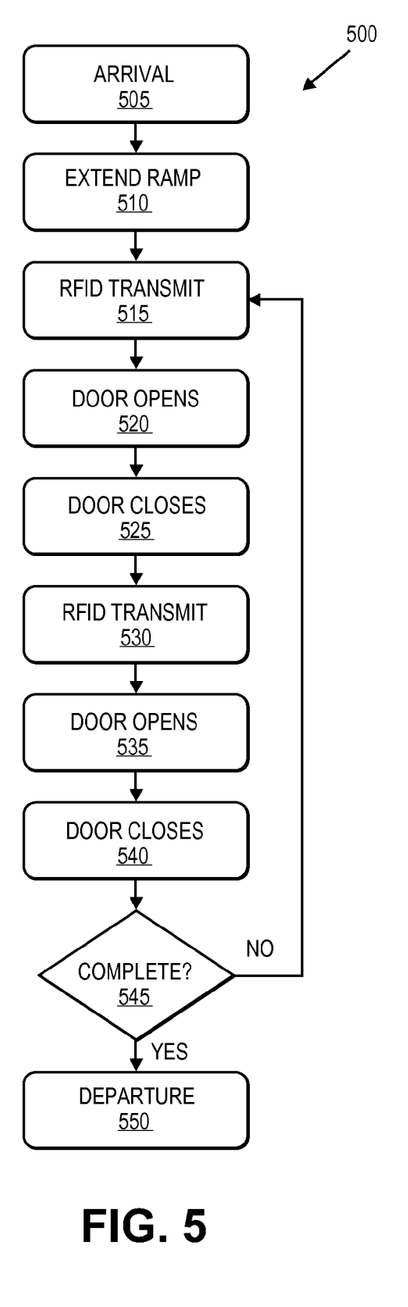
FIG. 5 is a flowchart of a method of using a trailer, according to an embodiment of the present disclosure.

FIG. 5 illustrates a method 500 of using the trailer 100 wherein the trailer includes a ramp mechanism, according to an embodiment of the present disclosure. As shown at 505, the process begins by the driver arriving at the destination and stopping the truck. At 510, the driver extends the ramp. At 515, the driver presses a button on an RFID transmitter unit to begin the transmission loop (see FIG. 7). According to another embodiment, a Bluetooth transmitter may be used instead of an RFID transmitter.

In one possible embodiment in which an RFID transmitter is used, the RFID transmitter can operate in an "always on" transmission mode, and the trailer 100 can be configured to disable the reception of transmissions such as through the use of a physical switch or other built-in control mechanism. As shown at 520, the reception of the transmission from the RFID unit of the driver causes the main door 301 to open. In an embodiment, the main door 301 is configured to remain open as long as the RFID unit of the driver is within range of the trailer 100. At 525, the driver presses a button on the RFID transmitter unit in order to cause the main door 301 to close. In some embodiments, the RFID transmitter can be configured such that pressing a button for more than, for example, two seconds, causes the transmitter to enter a sleep or low power mode wherein it ceases transmitting; once the transmitter ceases transmitting, the control box 210 can be configured to close the main door 301. Alternatively, the control box 210 may be configured with a button that turns off the RFID receiver in response to which, the main door 301 will close. According to another alternative embodiment, the control box 210 of the trailer 100 may be configured with predetermined timers that cause the main door 301 to close automatically after a predetermined time, even if the RFID transmitter is still within range. Once inside the trailer 100 with the door 301 closed, the driver may gather the customer's order without exposing the contents of the trailer to the exterior air. After the customer's order is gathered, the driver may again engage the RFID transmitter, which causes the main door 301 to open again. The driver may then leave the trailer with the customer's order, and the main door 301 can automatically shut once the RFID transmitter is outside of range. In an alternative embodiment, the main door 301 automatically shuts after a predetermined time. If the driver's delivery is complete, the driver may then get into the cab of his truck and leave. If the driver still has merchandise to unload, the driver can engage the RFID transmitter and return to 515 to continue the process until the customer's order is fully delivered.

Figure 6:
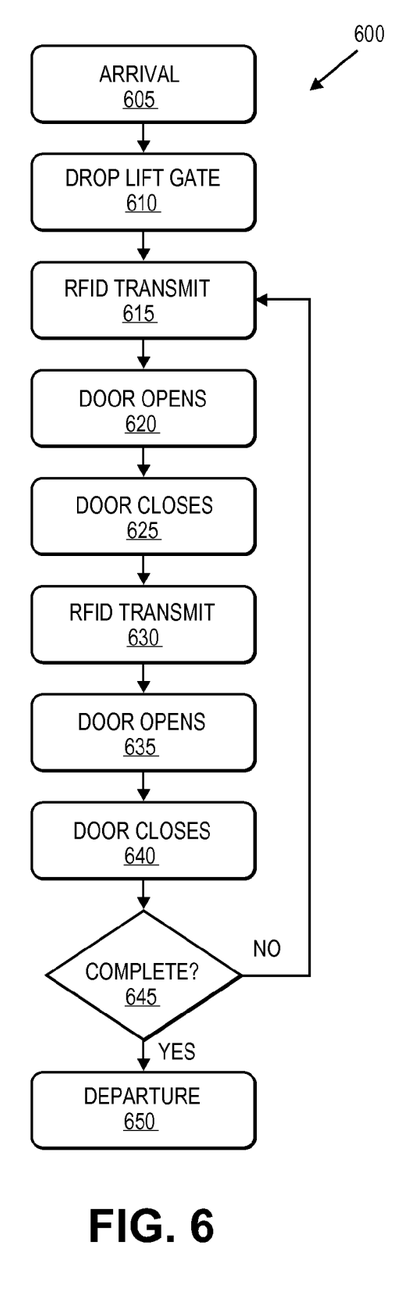
FIG. 6 is a flowchart of a method of using a trailer, according to an embodiment of the present disclosure.

FIG. 6 illustrates another embodiment of a method 600 of using a trailer, this time with a drop lift gate. The process flow can begin at 605, upon arrival at a customer delivery location. At 610, the process comprises dropping the lift gate 145 by any suitable amount, such as approximately 50%. According to an embodiment, the driver may then step up onto the lift gate 145 and activate an RFID transmitter. At 620, the main door 301 opens in response to the RFID transmission.

According to an embodiment, once inside the trailer 100, the driver deactivates the RFID transmitter by, for example, holding a button for a suitable period, such as for two or more seconds. According to another embodiment, the control box 210 may be configured to automatically cause the closing of the main door 301 after a predetermined amount of time, even if the RFID transmitter of the driver is still within range. Once inside the trailer 100, the driver gathers and prepares the customer's order, and may optionally position the order near the main door 301 and lift gate 145. Once the order is ready, the driver activates the RFID transmitter to open the main door 301. The driver then may push the customer's order onto the lift gate 145. Once on the lift gate 145, the driver may deactivate the RFID transmitter or alternatively, the main door 301 may be configured to close automatically after the passage of a predetermined amount of time and/or if the RFID transmitter is out of range. If the delivery is complete, the driver may get into the cab of the truck and leave. Otherwise, the driver may return to the RFID transmission at 615 of the method 600 and continue the loop until the order is complete.

The use of RFID transmitters facilitates relatively easy close-range signal transmission. However, using RFID transmitters can also introduce security concerns. In terms of the present disclosure, an unsecured or insufficiently protected RFID receiver might be taken advantage of and access gained to the contents of a trailer or container. One possible solution to the wireless transmission security concerns is physically enabling the receiver for use and disabling the receiver when not in use, although, this solution can be cumbersome. Another solution is to enable and disable the transmitter unit.

FIGS. 8-12 show flowcharts that illustrate other examples of using the systems of the present disclosure with a lift gate or a ramp. These examples include specific details, such as lowering the lift gate by 50%, pushing the transmitter button for 2 seconds or the use of a photo eye, which is a safety feature that is well known for use with overhead door opening systems generally. The specific details of these examples are merely exemplary and should not to be taken in a limiting sense. Thus, one of ordinary skill in the art would readily recognize that modifications could be made, such as lowering the lift gate by other percentages, using different time periods or employing other safety features in place of or in addition to the photo eye.

Figure 7:
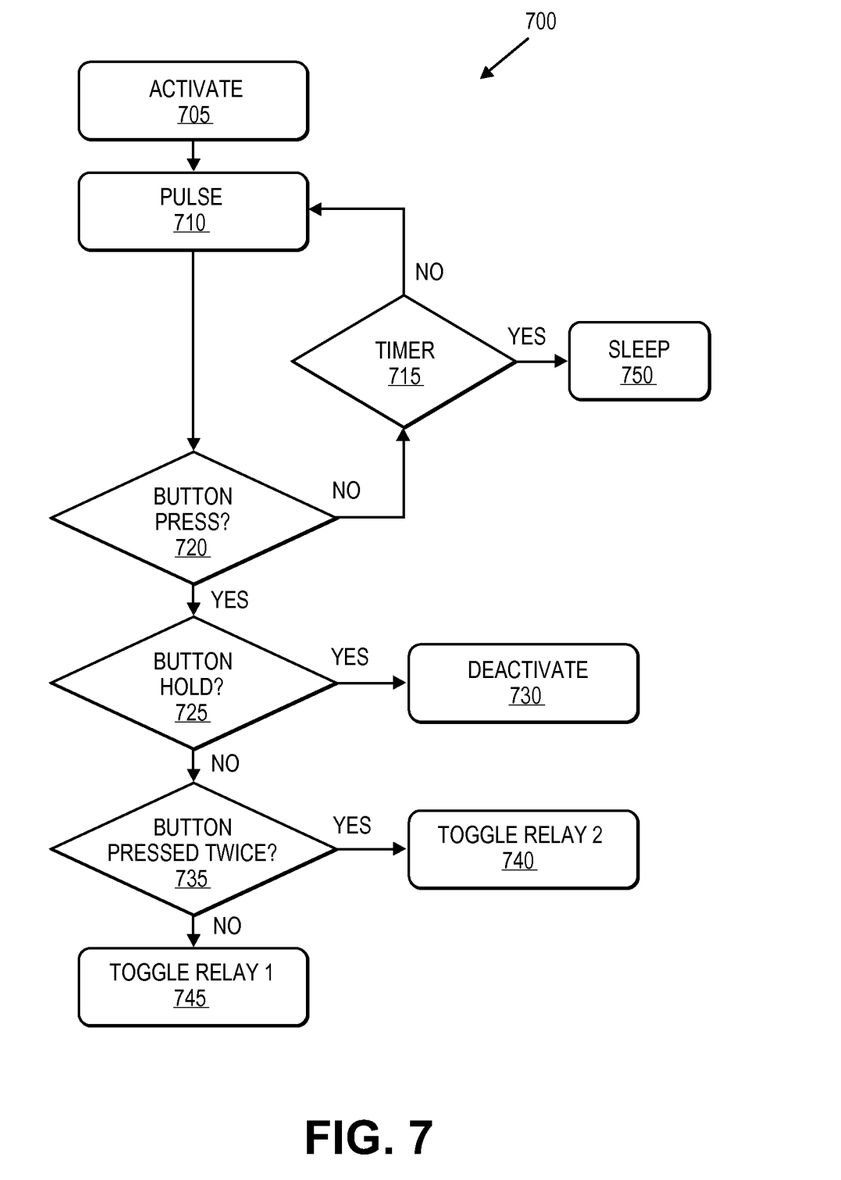
FIG. 7 shows a flowchart of a method of transmitting via an RFID transmitter, according to an embodiment of the present disclosure.
Figure 8:
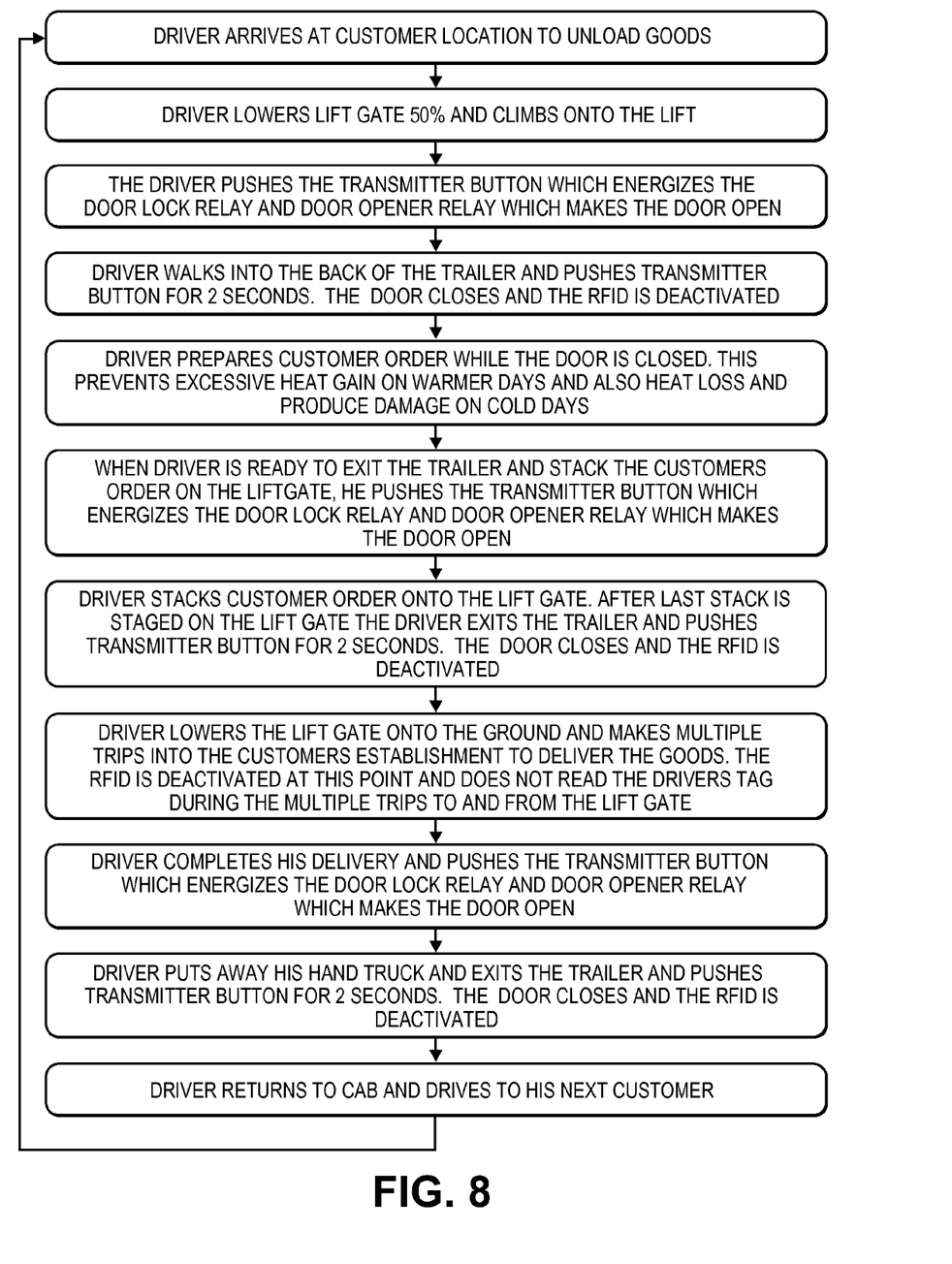
FIGS. 8-12 show flowcharts that illustrate methods of using the systems of the present disclosure with a lift gate or a ramp, according to embodiments of the present disclosure.
Figure 9:
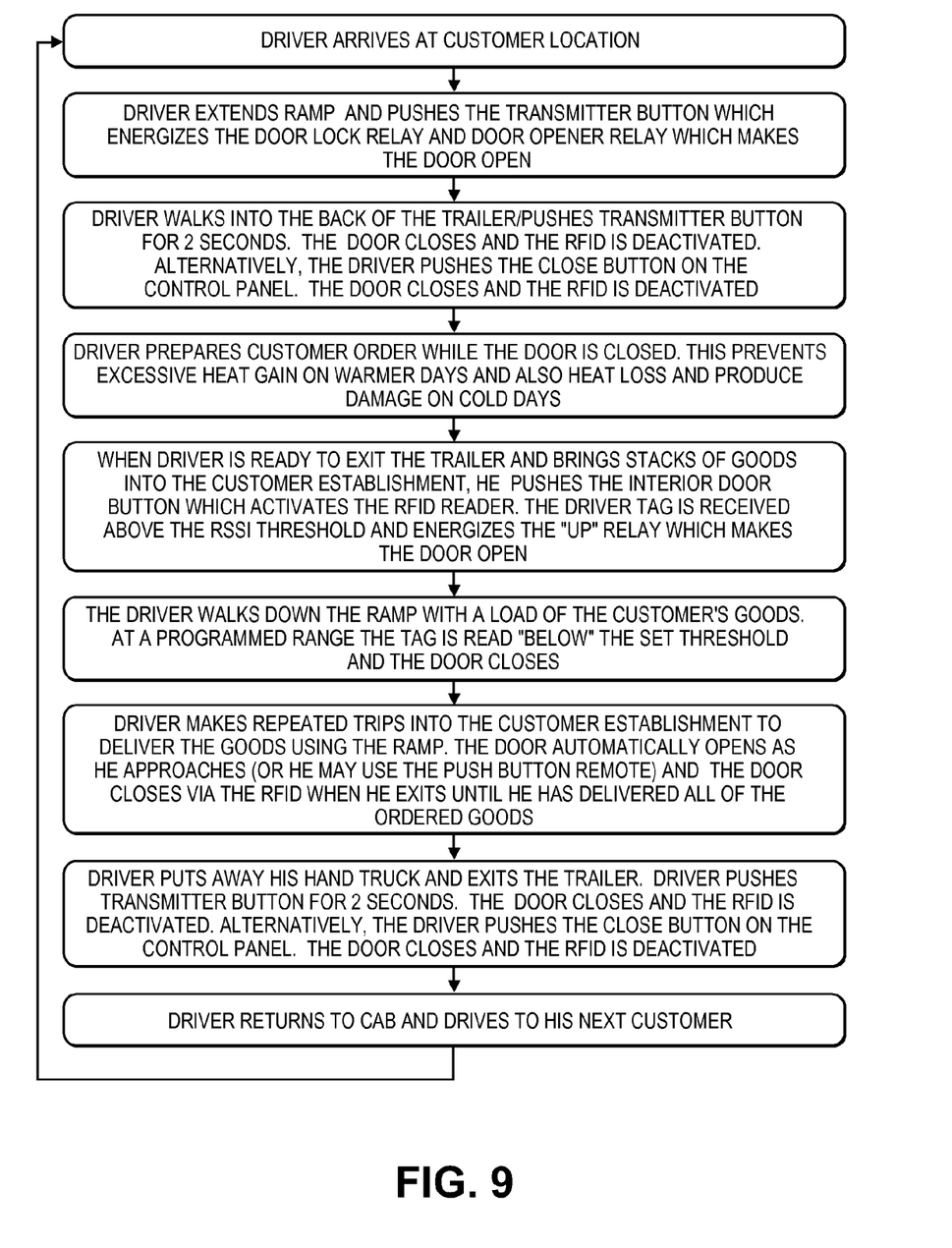
Figure 10:
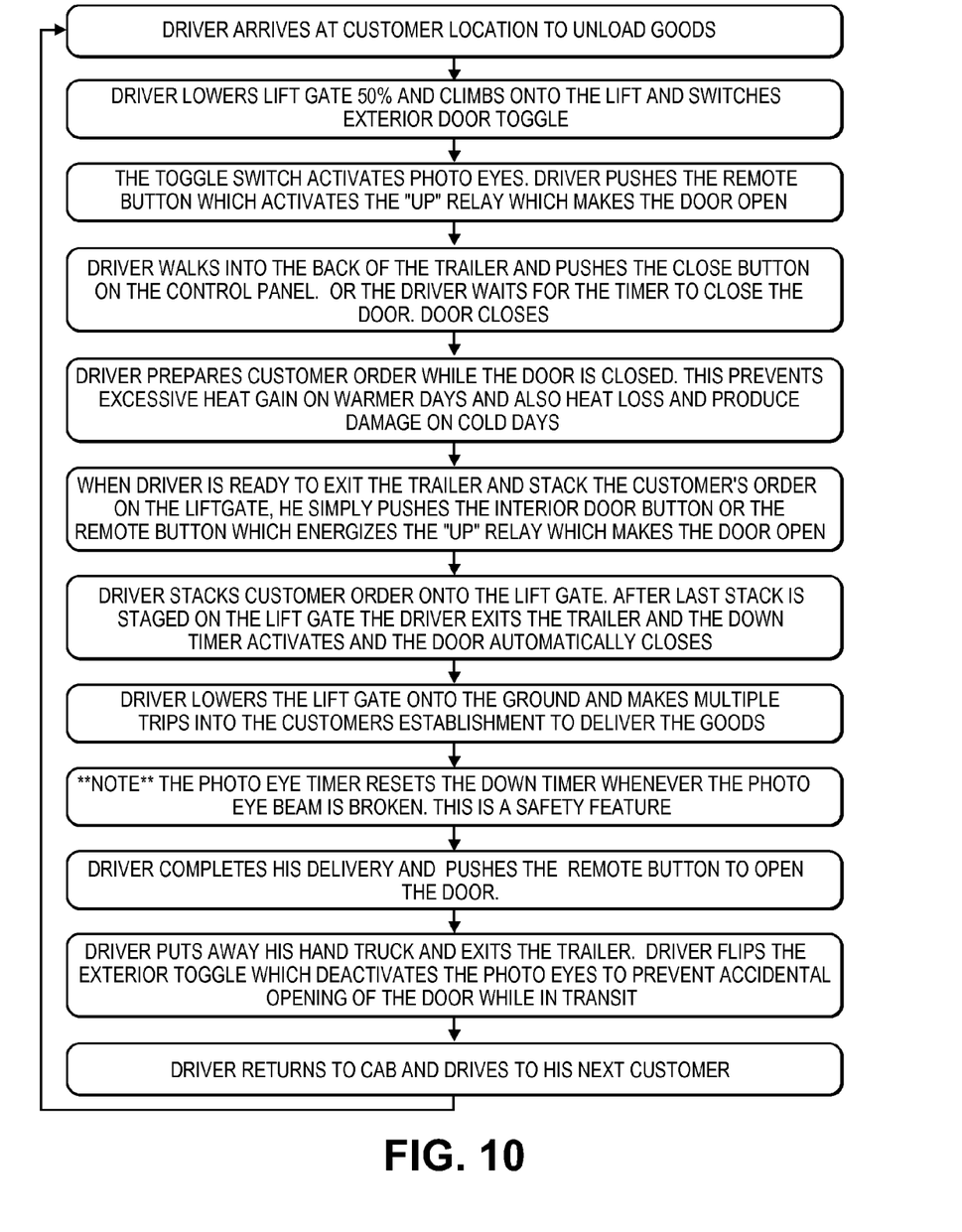
Figure 11:
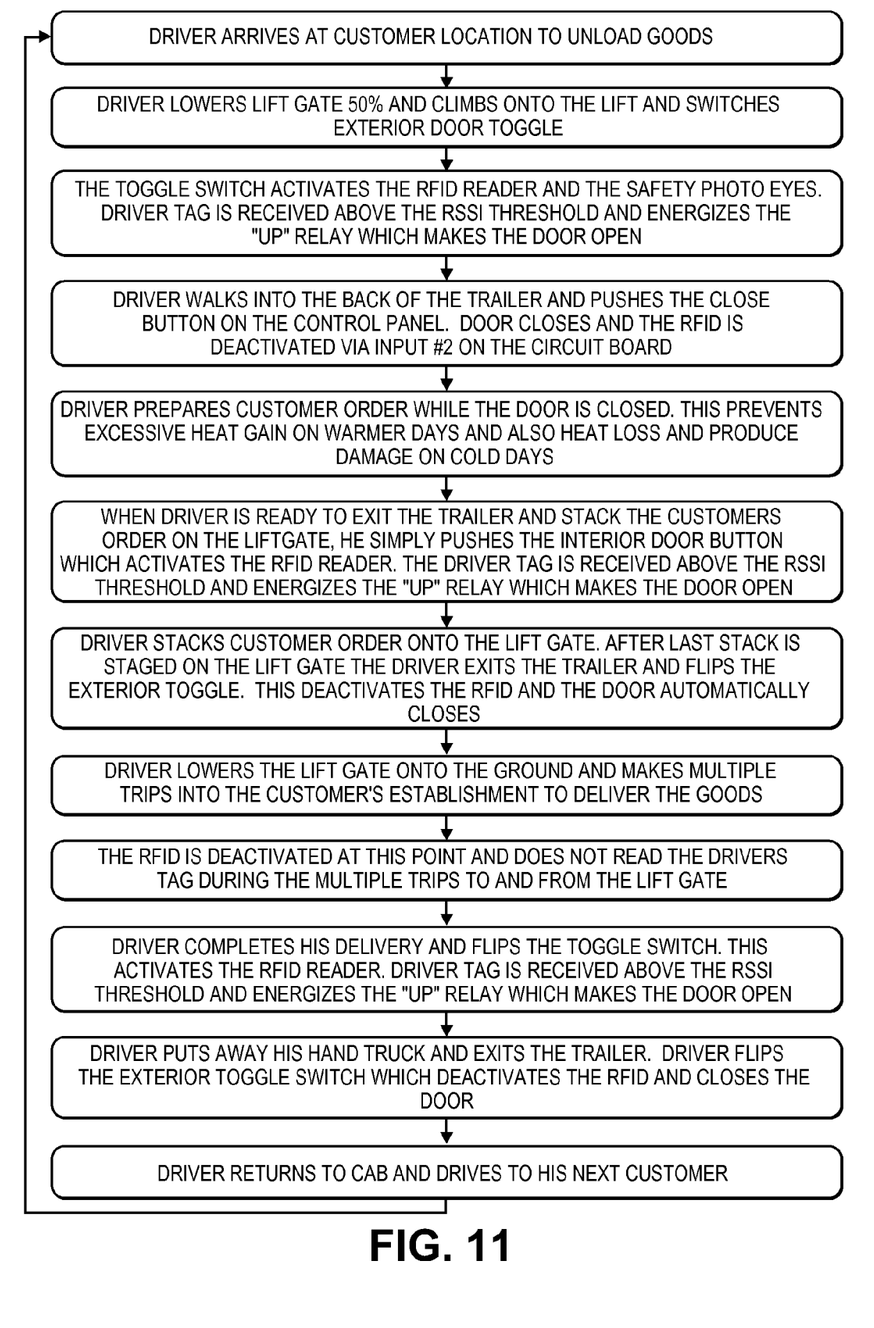
Figure 12:
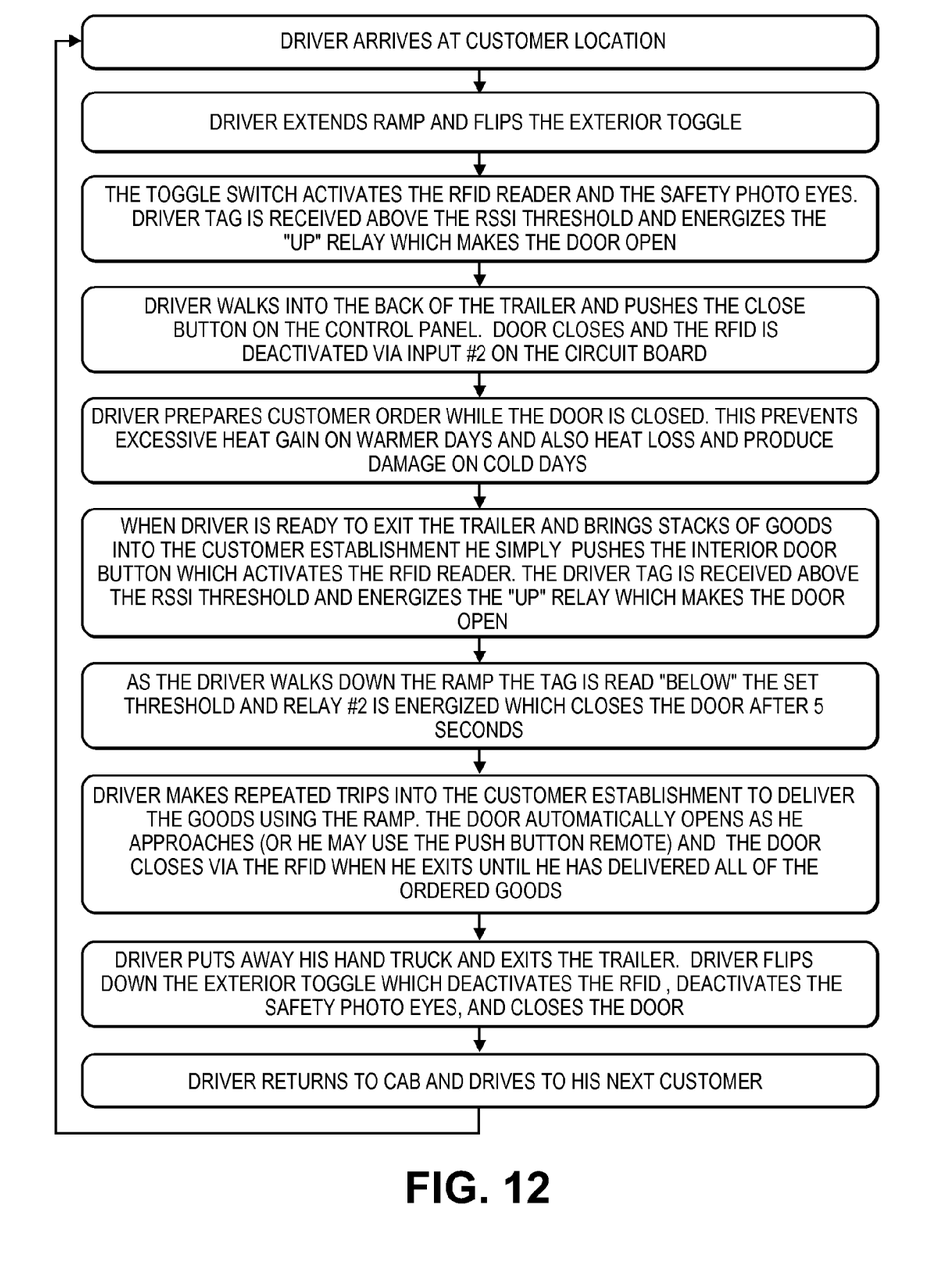

FIG. 7 illustrates an embodiment of a method 700 of transmitting to a receiver unit in the control box 210. The process flow at 705 shows that a user activates a transmitter unit, such as an RFID or other transmitter units discussed above. Generally speaking, this step comprises putting the transmitter unit in an operational state. In some embodiments, this may mean pressing a button on the transmitter unit. As shown at 710, an embodiment of the method comprises pulsing signals by the transmitter. For example, the transmitter can be configured to pulse at a desired rate, such as four times per second. The method may be configured to loop back so as to continue pulsing at 710 until a button is pressed. Until the button is pressed at 720, the transmitter may be configured to track the amount of time that has elapsed since the transmitter first was activated or a button was pressed, as shown at 715. Based upon the elapsed time, the transmitter can be configured to automatically enter a sleep mode. For instance, in one embodiment, after twenty minutes elapses, the timer may enter a sleep mode 750. According to one embodiment, when a button is held, the transmitter exits its pulse loop and deactivates, as shown at 725,730. According to other embodiments, the transmitter may be configured to automatically deactivate after the passage of a predetermined amount of time, for instance five minutes. In one embodiment, the transmitter is configured to deactivate when the button is held for two or more seconds. According to some embodiments, if the button is pressed twice, the transmitter is configured to toggle relay 2, as shown at 735,740. According to yet other embodiments, if the button is not pressed twice and is not held, the transmitter is configured to toggle relay 1, as shown at 745.

Figure 13:
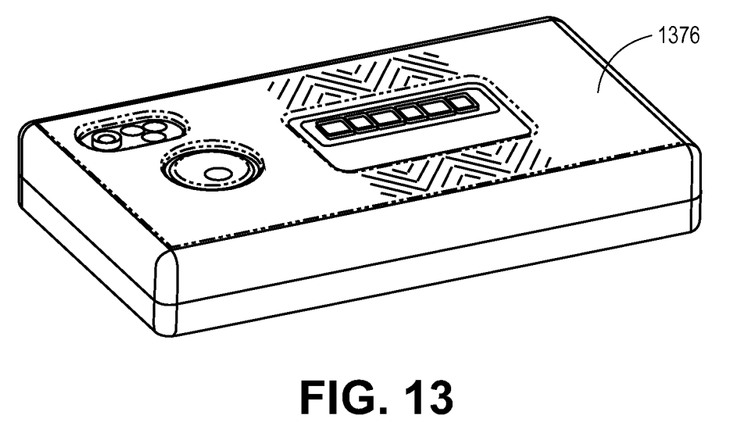
FIGS. 13 and 14 illustrate an RFID transmitter, according to an embodiment of the present disclosure.
Figure 14:
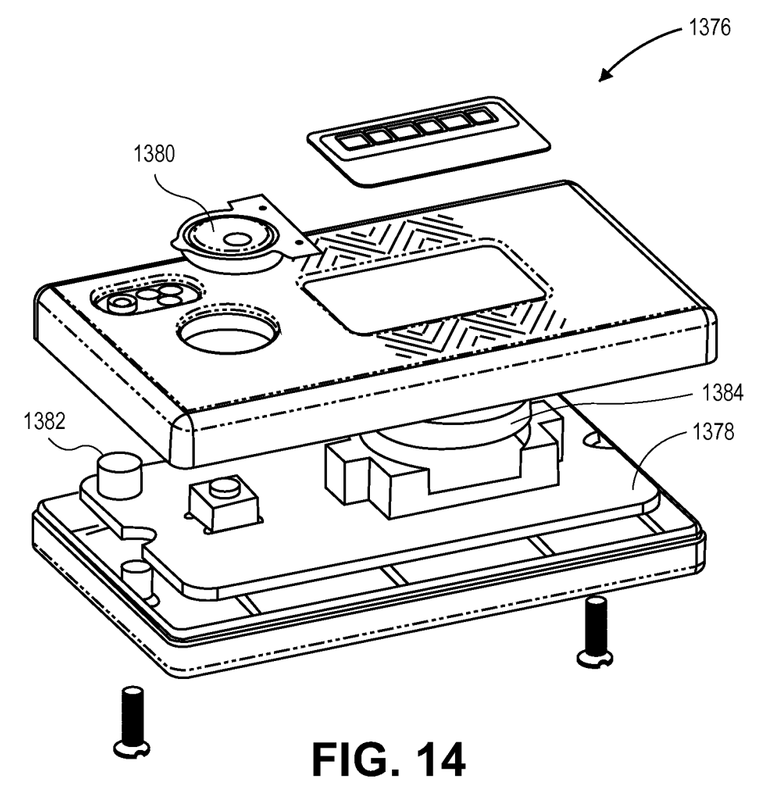

One embodiment of an acceptable RFID transmitter 1376 is illustrated at FIGS. 13 and 14. In an embodiment, RFID transmitter 1376 can include a printed circuit board 1378, a user control button 1380 or other user control mechanism, an indicator light 1382 and an energy source, such as battery 1384. Any other suitable transmitter could be employed for use in the systems of the present disclosure instead of, or in addition to, RFID transmitter 1376.

In an embodiment, the wireless system can provide a hands-free proximity detection system. Using radio frequency (RF) transmissions, a key fob can be monitored so that a trailer door can be opened or closed automatically based on the location of the key fob. For example, a user can walk up to the door and it will open, or walk away and it will close.

The system comprises at least one transmitter and one receiver, but can be enlarged to have many different transmitter-receiver pairs. Each transmitter and receiver can have a unique identification number that is used to pinpoint communication between the two transmitter and receiver units. This allows multiple transmitters to operate in the same area without accidently activating neighboring receivers. These identification numbers also allow tracking of personnel and equipment.

In an embodiment, when the transmitter is activated, it can continuously pulse commands to the receiver instructing it to activate or deactivate its control relays based on the programming of the transmitter. The time duration between these pulsed commands can be an adjustable setting stored on the transmitter, which can be defaulted to a desired pulse rate, such as, for example, four times a second. In an embodiment, after the transmitter sends out a command, it places itself into a sleep condition until the next command needs to be sent. The transmitter's signal strength can be controlled through programming software to adjust the activation distance between the transmitter and receiver.

The transmitter can be programed in any suitable manner to allow a user to perform desired functions using any suitable commands. An example of a set of commands and functions that can be used with an embodiment of transmitter 1376 is as follows: a user can press button 1380 when the device is in a powered down state to energize the transmitter and place it in an operational state; at which point the previous settings, such as a command for opening a door ("OPN command") will continuously be pulsed out of the transmitter; continuously pressing the button for a set length of time, such as, for example, two seconds, turns the device off; pressing the button for less than a set period of time, such as one second, while it is powered on can toggle a command for relay 1, thereby opening or unlocking a first door, for example; similarly, pressing the button twice in the set period of time can toggle a command for relay 2, and pressing the button three times in the set time period can toggle a command for relay 3. The transmitter can be programmed to automatically power down if the button 1380 is not pressed for a set time period, such as 20 minutes, thereby extending the battery life.

Figure 15:
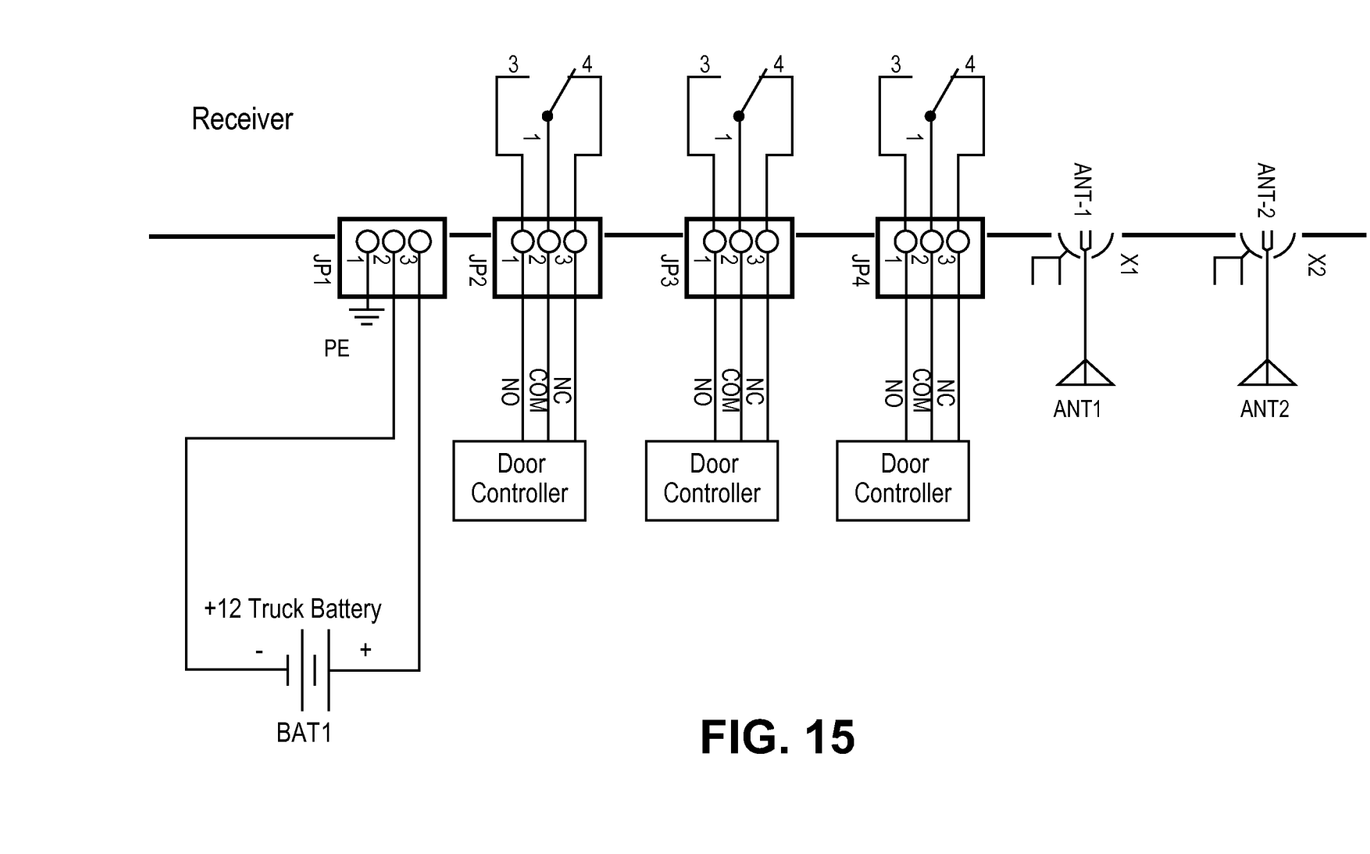
FIG. 15 illustrates a circuit diagram for a receiver, according to an embodiment of the present disclosure.

The receiver can be powered by any suitable power source, such as a 12 VDC that is over-current and reverse polarity protected. FIG. 15 illustrates one example of a circuit diagram for a receiver. In an embodiment, the receiver can include multiple relays, such as the three relays shown in FIG. 15. Each relay can handle a function of the receiver based on external signals received from the transmitter, such as opening/closing or locking/unlocking doors. Connection to the common ("COM"), normally open ("NO") and normally closed ("NC") contacts can be supplied through a terminal strip mounted on the side of the receiver box. The receiver can include any desired number of antennae. In an embodiment, two antenna connections are available. For example, antenna 1 ("ANT-1") can be a direct connect whip type antenna that can be used for immediate reception near the unit. Antenna 2 ("ANT-2") can be a secondary port that can be used to attach a remote antenna through a coaxial cable, for example.

In an embodiment, the receiver can have each of its relays set to one of two states; (1) deactivate when no signal is detected or (2) hold its current state. When the receiver is set to deactivate its relays, the relay can deactivate when a signal is no longer detected from the transmitter and a timeout period has expired, typically on the order of seconds, such as, for example, two seconds (e.g., an unlocked door can lock when the relay deactivates). When the transmitter signal is detected again, the relays can return to the current commanded state received from the transmitter (e.g., the door can return to being unlocked). When the receiver is set to hold the current state, the relays can remain in the last command state, even if the signal is not being received from the transmitter (e.g., the door remains unlocked when the signal is not being received).

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An apparatus comprising a pneumatic door system, the system comprising:
    a main door;
    a pneumatic lock positioned so as to be capable of locking the main door;
    a pneumatic mechanism for opening the main door;
    an air tank and a system of valves and conduits configured to provide fluid communication between the air tank, the pneumatic lock and the pneumatic door opening mechanism; and
    an electronic controller configured to open and close the valves to allow pneumatically opening or closing of the main door and pneumatically locking or unlocking of the pneumatic lock
    wherein the apparatus is chosen from a trailer or container, and further wherein the apparatus comprises a second door that is different from the main door, a second pneumatic lock positioned so as to be capable of locking the second door, the second pneumatic lock comprising a magnetic proximity switch configured to automatically actuate the lock when the door closes.

2. The apparatus of claim 1, wherein the main door is a seamless overhead door.

3. The apparatus of claim 1, further wherein the apparatus comprises an auxiliary tank configured for supplying air to operate the first pneumatic lock and the pneumatic door opening mechanism, and wherein the air tank is configured to supply air both for pneumatic brakes and to the auxiliary tank.

4. The apparatus of claim 3, further comprising one or more one-way check valves for maintaining pressure within the auxiliary air tank.

5. The apparatus of claim 1, further comprising a refrigeration unit for maintaining a desired temperature.

6. The apparatus of claim 1, wherein the controller is configured to allow wireless communication.

7. An apparatus comprising a pneumatic door system, the system comprising:
    a main door;
    a pneumatic lock positioned so as to be capable of locking the main door;
    a pneumatic mechanism for opening the main door;
    an air tank and a system of valves and conduits configured to provide fluid communication between the air tank, the pneumatic lock and the pneumatic door opening mechanism; and
    an electronic controller configured to open and close the valves to allow pneumatically opening or closing of the main door and pneumatically locking or unlocking of the pneumatic lock
    wherein the apparatus is chosen from a trailer or container, and further wherein the pneumatic lock comprises a magnetic proximity switch configured to automatically actuate the pneumatic lock when the main door closes.

8. The apparatus of claim 7, wherein the main door is an overhead door.

9. The apparatus of claim 7, wherein the main door is a seamless overhead door.

10. The apparatus of claim 7, wherein the air tank is configured to supply air for pneumatic brakes, and further wherein the apparatus comprises an auxiliary tank configured for supplying air to operate the first pneumatic lock and the pneumatic door opening mechanism.

11. The apparatus of claim 10, further comprising one or more one-way check valves for maintaining pressure within the auxiliary air tank.

12. The apparatus of claim 7, further comprising a refrigeration unit for maintaining a desired temperature.

13. The apparatus of claim 7, wherein the controller is configured to allow wireless communication.

14. The apparatus of claim 1, wherein the main door is an overhead door.

15. An apparatus comprising a pneumatic door system, the system comprising:
    a main door;
    a pneumatic lock positioned so as to be capable of locking the main door, the pneumatic lock comprising a pneumatic bolt and a drop bolt receiver for receiving the pneumatic bolt;
    a pneumatic mechanism for opening the main door;
    an air tank and a system of valves and conduits configured to provide fluid communication between the air tank, the pneumatic lock and the pneumatic door opening mechanism; and
    an electronic controller configured to open and close the valves to allow pneumatically opening or closing of the main door and pneumatically locking or unlocking of the pneumatic lock;
    wherein the apparatus is chosen from a trailer or container, and further wherein the pneumatic lock further comprises a magnetic proximity switch configured to automatically actuate the pneumatic lock so as to cause the pneumatic bolt to extend into the drop bolt receiver and thereby lock the main door when the main door closes.

16. The apparatus of claim 1, wherein the pneumatic lock further comprises a pneumatic bolt and a drop bolt receiver for receiving the pneumatic bolt, the magnetic proximity switch being configured to automatically actuate the pneumatic lock so as to cause the pneumatic bolt to extend into the drop bolt receiver and thereby lock the main door when the main door closes.

* * * * *